United States Patent [19]

Picandet et al.

[11] 4,133,986
[45] Jan. 9, 1979

[54] SUBSCRIBER'S LINE EQUIPMENT FOR A TELEPHONE EXCHANGE

[75] Inventors: Jean A. Picandet, Paris; André N. Baratin, Neuilly sur Seine, both of France

[73] Assignee: Jeumont-Schneider, Puteaux, France

[21] Appl. No.: 851,871

[22] Filed: Nov. 16, 1977

[30] Foreign Application Priority Data

Nov. 25, 1976 [FR] France ........................... 76 35606

[51] Int. Cl.² ............................................. H04B 1/58
[52] U.S. Cl. ........................ 179/170 NC; 179/18 FA
[58] Field of Search ......... 179/170 NC, 18 FA, 18 F, 179/81 R, 84 R, 99, 77

[56] References Cited

U.S. PATENT DOCUMENTS 4,039,766   8/1977   Picandet ..................... 179/170 NC

FOREIGN PATENT DOCUMENTS 2347696   4/1975   Fed. Rep. of Germany.

*Primary Examiner*—Thomas A. Robinson
*Attorney, Agent, or Firm*—Bacon & Thomas

[57] ABSTRACT

A subscriber's telephone line equipment for connection to a telephone exchange for replacing a telephone transformer or other kind of transformer. The equipment comprises a circuit connected to the telephone line which comprises two voltage sources, a chopper circuit, a voltage-doubling rectifier, a current-limiting circuit and a closed-loop detecting circuit, and receiving and transmitting circuits connected to said telephone exchange.

3 Claims, 1 Drawing Figure

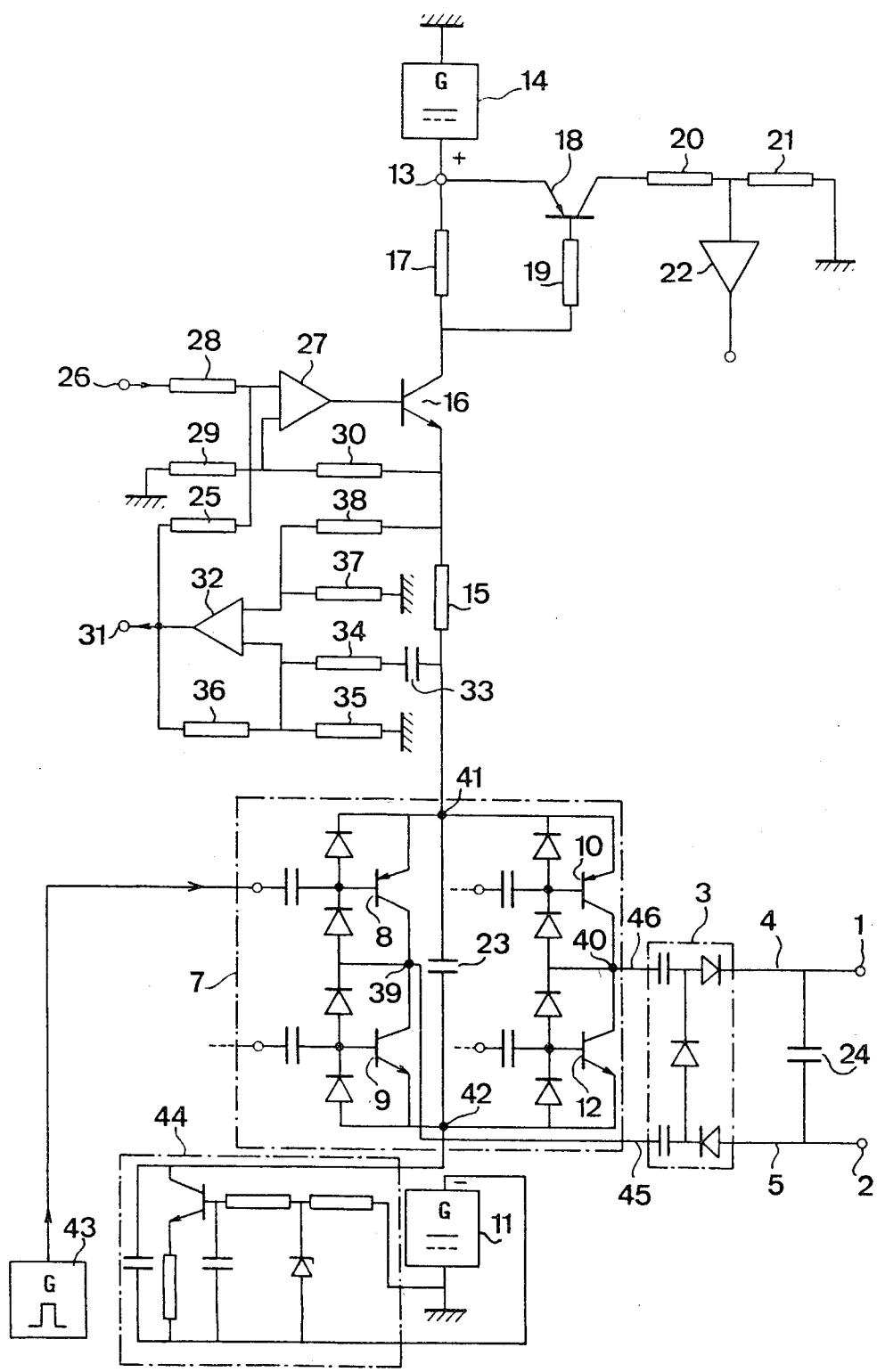

SUBSCRIBER'S LINE EQUIPMENT FOR A TELEPHONE EXCHANGE

BACKGROUND OF THE INVENTION

The invention relates to telephone line equipment and more particularly to equipment for use in an electromechanical or electronic telephone exchange. It comprises a two-wire to four-wire conversion circuit, a circuit for supplying d.c. (at 48 V) to the subscriber's line, and a closed loop detection circuit. The equipment may also, in a known manner, comprise a ringing signal transmission circuit (70 V and 50 Hz) and a device for limiting the ringing current in the event of a short-circuit on the subscriber's line.

In conventional subscriber's line equipment, two-wire to four-wire conversion is normally accomplished by a telephone transformer, or sometimes by a (different kind of) transformer which is simpler and less bulky than a telephone transformer, together with a 48 V supply bridge, a current-limiting device, a closed loop detecting means, a switching relay on the ringing current circuit, and a device for limiting the last-mentioned current. The aforementioned equipment has the disadvantages of being bulky and expensive.

The equipment according to the invention does not have any of the aforementioned disadvantages, since it does not comprise a telephone transformer or any other kind of transformer, but uses a chopper, which is compact and less expensive.

BRIEF SUMMARY OF THE INVENTION

The equipment according to the invention is characterised in that it comprises: a direct current supplying circuit which comprises a first, constant direct current source, a second direct current source, a chopper circuit arranged in a bridge configuration, having four symmetrical arms, voltage-doubling rectifying means connected to the ends of one diagonal of said chopper circuit, a decoupling capacitor shunting the ends of the other diagonal of said chopper circuit, said capacitor also being connected in series to said first and second current sources, control means for supplying said chopper circuit control signals in the form of rectangular pulses having a duty factor of 0.5 and a radio frequency repetition frequency, a first resistor connected in series between said second current source and said chopper circuit, a current-limiting circuit connected in series between said first current source and said chopper circuit, and a capacitor shunting said subscriber's line, a first circuit for transmitting from said telephone exchange to said subscriber's line which comprises an emitter-follower connected transistor whose emitter-collector circuit is connected in series between said first resistor and said second current source, and a first amplifier connected to the base of said emitter-follower connected transistor, a second circuit for transmitting voice signals from said subscriber's line to said telephone exchange which comrpises a second, differential amplifier, and an anti-sidetone circuit connected between the inputs of said second amplifier and the terminals of said first resistor, a second resistor connected in series between said second current course and said emitter-collector circuit of said emitter-follower connected transistor; and a threshold circuit connected to the terminals of said second resistor for delivering a signal, the level of which represents the state of the subscriber's loop.

BRIEF DESCRIPTION OF THE DRAWING

The invention will be more clearly understood from the following example and the single accompanying FIGURE, which shows the electric circuit of telephone line equipment of the invention. To avoid overloading the drawing, the ringing current transmission circuit has not been shown.

DETAILED DESCRIPTION OF THE PREFERRED EMBODIMENT

In the drawing, the subscriber's line is indicated by its two terminals 1 and 2 which are connected to the outputs 4, 5 respectively of a voltage-doubling and rectifying means 3 constructed in a known manner from diodes and capacitors disposed as in the drawing.

A chopper 7 is connected as a bridge having four symmetrical arms and comprises four common-emitter connected transistors 8, 9, 10, 12, two PNP transistors 8, 10 and two NPN transistors 9, 12.

The common point 39 of the collectors of transistors 8, 9 is the first output of the chopper. The common point 40 of the collectors of transistors 10, 12 is the second output of the chopper. Points 39 and 40, which are the ends of one diagonal of the bridge, are connected to the subscriber's line terminals by means 3 and connections 45, 46 respectively. The emitters of transistors 8, 10 are connected to the first input terminal 41 of the chopper. The emitters of transistors 9 and 12 are connected to the second chopper input terminal 42. The base of each transistor is connected via a capacitor to a generator of rectangular pulses having a duty factor of 0.5 and a repetition radio frequency. To simplify the drawing, only one of the four generators (43) has been shown.

The input terminals 41, 42 of chopper 7 are supplied by the sum of the voltages from two d.c. sources 11, 14. Source 14 is constant, or is kept constant by known regulating means. The positive terminal of 11 and the negative terminal 14 are grounded. The negative terminal of 11 is connected to the chopper terminal 42 via a known current-limiting circuit 44, an example of which is shown in the FIGURE. Chopper terminal 41 is connected to the positive terminal 13 of source 14 via a circuit comprising a resistor 15 in series with the emitter-collector circuit of an NPN transistor 16 and a second resistor 17.

Connection 16–17 is connected to the base of a PNP transistor 18 via a resistor 10. The emitter of transistor 18 is connected to terminal 13 whereas the collector is connected to ground via two resistors 20, 21 in series, the series connection of which is connected to the input of an amplifier 22 whose output signal level indicates the state of the subscriber's line loop. Components 17–22 constitute the corresponding detection circuit.

A capacitor 23 is connected between terminals 41 and 42.

Outputs 4, 5 are likewise shunted by a capacitor 24. Capacitors 23, 24 are designed for high-frequency decoupling of chopper 7.

Voice signals on the telephone exchange en route for to the subscriber's line arrive via terminal 26 and are processed by a transmission circuit comprising an amplifier 27 having two inputs, one being connected to terminal 26 via a resistor 28 whereas the other is connected by a resistor 29 to ground and by a resistor 30 to the emitter of transistor 16. Amplifier 27 is connected to the base of transistor 16.

Voice signals coming from the subscriber's line en route to the telephone exchange are processed by a transmission circuit connected to the exchange by terminal 31 and comprising a differential amplifier 32 whose output is connected at 31, one of the two inputs of amplifier 32 being connected (a) to terminal 41 via a capacitor 33 in series with a resistor 34 (to stop the d.c. component appearing at the aforementioned terminal) and (b) to ground via a resistor 35 and to terminal 31 via a resistor 36. The output of 32 is connected to connection 27–28 by a resistor 25 to adjust the output impedance between 1 and 2. The other input of amplifier 32 is connected (a) to ground via a resistor 37 and (b) to connection 15–16 by a resistor 38. Components 34–38 together form an anti-sidetone circuit. Resistance bridges 34–35 and 37–38 are designed so that variations in voltage at the output of 27 do not affect the output of 32.

The equipment shown in the drawing operates as follows:

The transistors of the four chopper arms are cyclically actuated so that the transistors in each pair of opposite arms (8 and 12 or 9 and 10) are in the same state, i.e. conductive or non-conductive, whereas the transistors in the other two arms are in the opposite state.

The voltage collected between 39 and 40 is alternating since points 39, 40 alternate between the most negative voltage (the NPN transistor emitter potential) and the most positive voltage (the PNP transistor emitter potential). All the transistors operate by switching, and consequently the chopper is highly efficient.

Capacitor 23 is used for high-frequency decoupling, thus preventing any switching signals from returning and interfering with the circuits adjacent the chopper 7.

The four rectangular control signals from the generators such as 43 are supplied by a time base. The doubler and rectifier 3, which comprises two capacitors and three diodes, rectifies the square signal at its input and simultaneously doubles its peak value.

Capacitor 24 is used for filtering the output voltage and storing the energy during the non-conductive phases of the chopper. The value of 24 is low, to avoid appreciably attenuating the voice-frequency signals.

The output d.c. voltage is almost twice the chopper supply voltage. The only voltage losses are due to the collector-emitter saturation voltages of each transistor and to the forward voltage of the diodes.

In order to improve the performance of the device, inter alia the switching times, diodes are placed between (a) the emitter and base and (b) the base and collector of each transistor 8, 9, 10, 12, thus reducing the storage time.

Case 1: The subscriber's line 1–2 is open and the equipment is inoperative.

The bases of the transistors in 7 receive pulses from the four generators such as 43. The pulses chop the voltage between terminals 41 and 42. The transformation ratio of device 3 is such that a d.c. voltage of approximately 48 V appears between terminals 1 and 2. The current supplied by transistor 16 is used only to compensate losses in the circuit but is insufficient to release transistor 18; consequently the signal coming from 22 is zero, indicating that the loop is open.

Case 2: Subscriber's line 1–2 is looped to a subscriber's telephone set.

The current flowing in this line produces an increase in current in transistors 8, 9, 10, 12. Transistor 18 thereupon becomes conductive and a signal appears at the output of 22, indicating that the loop is closed. Resistors 15, 25 have been chosen so that the impedance, relative to line 1–2, is 600 ohms.

Case 3: Line 1–2 is short-circuited.

In that case the, current in transistors 7 increases to the limiting value which can be supplied by source 11. Consequently, the short-circuit current flowing between points 1, 2 is limited to half the current supplied by 11.

Case 4: The exchange transmits a voice signal at terminal 26.

A low-frequency signal appearing at terminal 26 causes a proportional variation in voltage at terminal 41. This results in modulation of the pulses transmitted by chopper 7 to device 3, which reconstructs the low-frequency signal at its output.

Case 5: Line 1–2 receives a voice signal form a subscriber to be transmitted to the telephone exchange.

The variation in the resistance of the microphone in the set of the subscriber connected with the line 1–2 causes a variation in voltage between the terminals 39 and 40. A proportional voltage variation occurs at the terminals of resistor 15. The differential amplifier 32 extracts the aforementioned variations in the total signal appearing at the terminals of resistor 15 and transmits the resulting signal at the output terminal 31.

We claim:

1. A subscriber's telephone line equipment for connection to a telephone exchange comprising:
   (a) a direct current supplying circuit which comprises:
      (i) a first, constant direct current source;
      (ii) a second direct current source;
      (iii) a chopper circuit arranged in a bridge configuration, having four symmetrical arms;
      (iv) voltage-doubling rectifying means connected to the ends of one diagonal of said chopper circuit;
      (v) a decoupling capacitor shunting the ends of the other diagonal of said chopper circuit, said capacitor also being connected in series to said first and second current sources;
      (vi) control means for supplying said chopper circuit control signals in the form of rectangular pulses having a duty factor of 0.5 and a radio frequency repetition frequency;
      (vii) a first resistor connected in series between said second current source and said chopper circuit;
      (viii) a current-limiting circuit connected in series between said first current source and said chopper circuit; and
      (ix) a capacitor shunting said subscriber's line;
   (b) a first circuit for transmitting from said telephone exchange to said subscriber's line which comprises:
      (i) an emitter-follower connected transistor whose emitter-collector circuit is connected in series between said first resistor and said second current source; and
      (ii) a first amplifier connected to the base of said emitter-follower connected transistor;
   (c) a second circuit for transmitting voice signals from said subscriber's line to said telephone exchange which comprises:
      (i) a second, differential amplifier; and
      (ii) an anti-sidetone circuit connected between the inputs of said second amplifier and the terminals of said first resistor;

(d) a second resistor connected in series between said second current source and said emitter-collector circuit of said emitter-follower connected transistor; and (e) a threshold circuit connected to the terminals of said second resistor for deliverying a signal, the level of which represents the state of the subscriber's loop.

2. The telephone line equipment as recited in claim 1, wherein said chopper circuit is comprised of transistors.

3. The telephone line equipment as recited in claim 2, further including diodes connected between the emitter and base and the base and collector of each transistor in said chopper circuit.

* * * * *